April 9, 1968  R. K. HILL  3,377,534
BRUSHLESS D.C. MOTOR
Filed Feb. 1. 1966  3 Sheets-Sheet 1
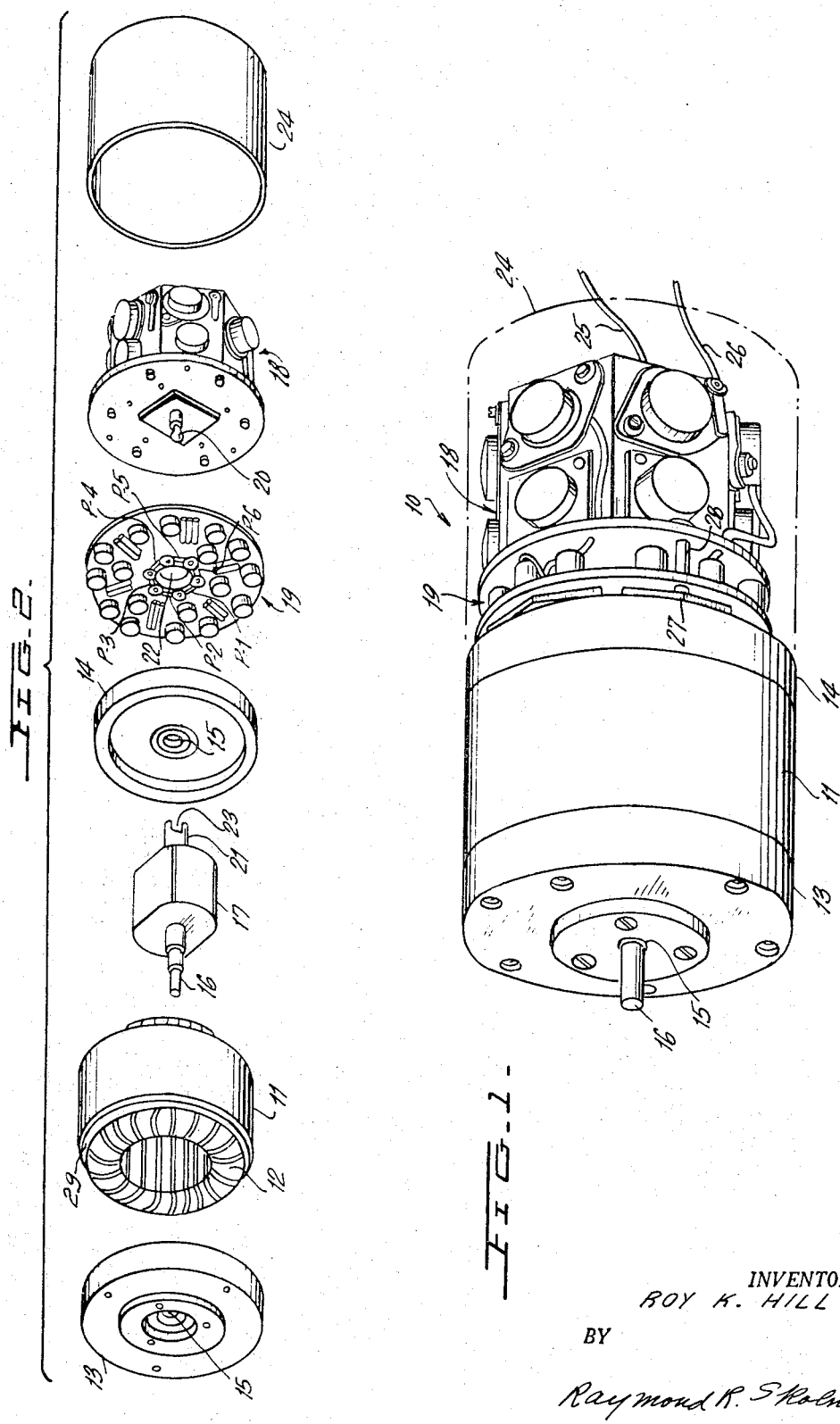
INVENTOR.
ROY K. HILL
BY
Raymond R. Skolnick

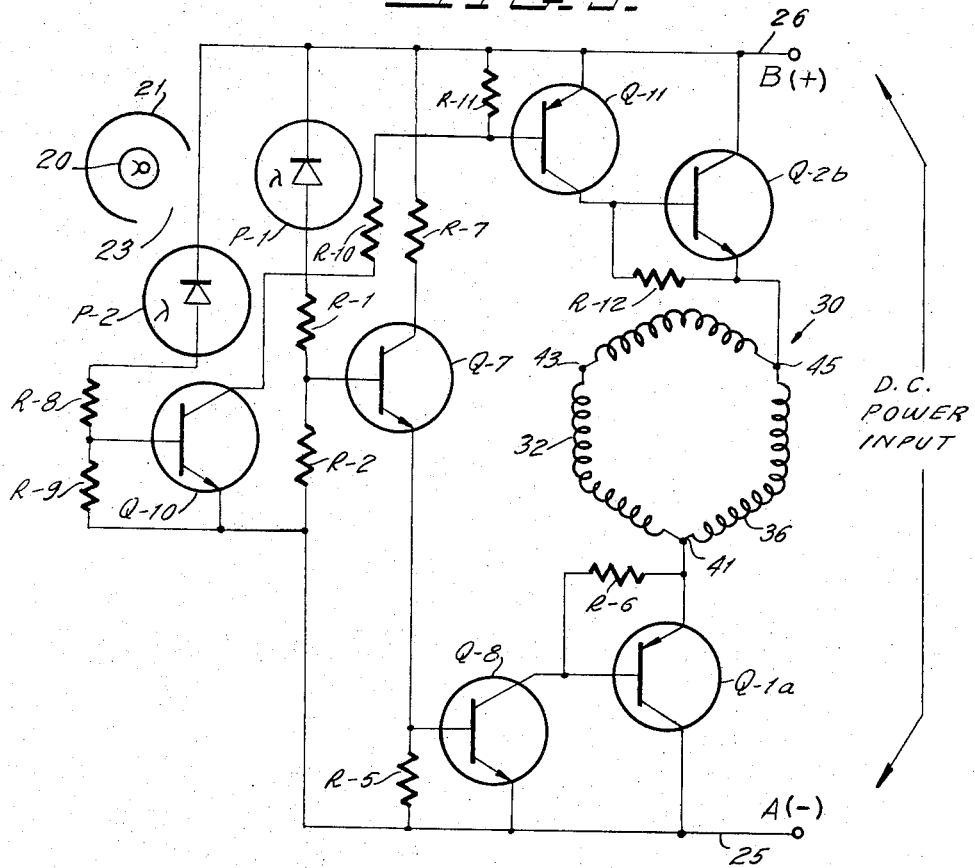
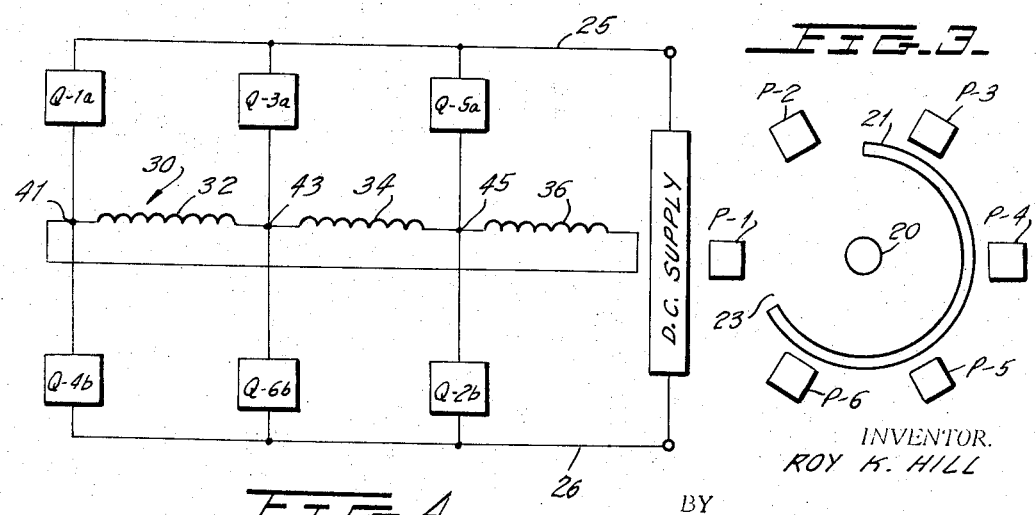

United States Patent Office 3,377,534
Patented Apr. 9, 1968

3,377,534
BRUSHLESS D.C. MOTOR
Roy K. Hill, Bristol, Tenn., assignor to Sperry Rand Corporation, Sperry Farragut Company Division, Bristol, Tenn.
Continuation-in-part of application Ser. No. 228,849, Oct. 8, 1962. This application Feb. 1, 1966, Ser. No. 524,016
11 Claims. (Cl. 318—138)

This application is a continuation-in-part of my copending application Ser. No. 228,849 filed Oct. 8, 1962, and relates to direct current energized motors in general. More particularly this application relates to an improved motor having the operating characteristics of a conventional D.C. motor, yet is constructed so that commutation takes place without utilizing wearing surfaces, sliding surfaces, separable contacts, or contact devices having relatively movable parts which physically engage one another.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

In a conventional direct current machine, commutation is essentially a mechanical switching operation by which currents through the various armature conductors are advanced and cyclically reversed in sequence as a function of rotor position by motor action. This continuous switching process is accomplished by means of brushes and a segmented commutator so that commutation is unavoidably accompanied by friction, wear, and sparking with its attendant generation of RF noise. These disadvantages of commutation frequently prohibit the utilization of D.C. motors in critical applications even though the performance characteristics and input requirements favor the use of a D.C. motor in all other respects.

The prior art has produced a number of brushless D.C. machines without providing the overall performance characteristics of a conventional commutation D.C. machine. That is, these prior art machines either convert direct current to alternating current to effectively provide an A.C. induction motor, utilize rotor velocity for switching control so that switching control is not effective at all positions of the rotor, utilize a plurality of separate windings or armatures with each winding or armature operating during only a portion of each revolution thereby requiring relatively more magnetic and current carrying materials than required when all winding portions are simultaneously energized as in the conventional winding, or utilize circuitry having excessive voltage drops in extra elements for creating bilateral switching circuits from a plurality of unilateral transistor and diode devices with the circuits requiring a plurality of power sources.

In my aforesaid application Ser. No. 228,849, conventional commutation is simulated by an optical sensing system is conjunction with electronic switching by utilizing a permanent magnet rotor for field excitation in combination with a closed loop armature winding having a plurality of equally spaced taps. In this form of winding, the entire winding is always energized and only the winding taps are sequentially changed in their electrical connection to the energizing source by commutation.

The closed loop winding possesses advantages which become apparent when compared to separately energized windings. The closed loop winding requires a number of conductors to produce the required counter electromotive force, as does each winding section of some of the prior art devices employing separately and sequentially energized winding sections. Now, consider increasing the number of winding sections of the two forms to decrease the angular zone of commutation, as may be preferred in a construction for reasons to be discussed hereinafter. The total number of conductors required for a device employing separately energized winding sections becomes greater as the number of winding sections are increased, while the total number of conductors of the closed loop winding does not increase, but only the number of winding taps are increased. Thus, as is now apparent, the size and weight of the device employing separately energized windings must either increase, or the wire diameter of the winding made relatively smaller to fit into the same available winding space, resulting in higher electrical resistance and higher power loss therefrom.

The closed loop winding having no D.C. isolation between taps, and requiring electrical connection, by way of switching elements, from each winding tap to either polarized terminal of the D.C. energizing source, imposes electrical circuit limitations in the form of D.C. isolation problems which are not encountered with some of the prior art device winding forms which employ separately energized windings, or windings having one winding terminal connected to one terminal of the energizing source and the other winding terminals operatively connected to only one polarized terminal of the energizing source. That is, circuits which are suitable for a device employing separately energized winding sections are not suitable for the closed loop winding configuration.

The device of the instant application, as well as the device in my aforesaid application Ser. No. 228,849, while employing the closed loop winding configuration, includes electrical circuits which are capable of operatively connecting the winding taps of the closed loop winding to either polarized terminal of the D.C. energizing source without requiring an additional bias source or other additional isolated power source. Yet, the circuit provides for only a single voltage drop in each commutating element, so that the voltage drop is no greater than that of the conventional brush machine.

In one preferred embodiment of my aforesaid application Ser. No. 228,849, a pair of taps operatively connected to the energizing source are located 180 degrees from each other around the closed loop winding which results in an even number of taps. These taps are simultaneously connected to and disconnected from the energizing source.

The device disclosed in the instant application includes a closed loop winding having an odd number of winding taps. Pairs of taps are not located 180 degrees apart around a closed loop winding having an odd number of taps, as they are with a winding having an even number of taps. Hence, taps located the nearest to 180 degrees apart around the closed loop winding are operatively connected to the energizing source. The angular distance, in the nearest direction around the winding, is 180 degrees, minus half the angular distance between taps, mathematically stated: $180° - (180/N)$ where N is the number of taps.

The individual taps of the pair being operatively connected to the energizing source are not operatively connected at the same instant of time, as is the case with the even number of taps. Instead, the individual taps are operatively connected in an overlapping staggered sequence, simulating conventional commutation of an odd segment machine by advancing and reversing currents in the armature conductors in sequence as a function of rotor position.

Thus, the instant invention provides a brushless direct current motor, including the conventional closed loop winding preferably having an odd number of taps (or winding sections and junctures as some prefer to identify the winding form), and to achieve the desirable characteristics of the conventional commutating machine, but does not require relatively moving parts in physical engagement in order to achieve commutation.

A light source fixed to the motor frame has the beam thereof directed through an aperture in a shield carried by the rotor and rotatable therewith. In this device, in contrast to my said previous application in which preferred operation was achieved by illuminating one photoelectric device, the light beam passing through the aperture of the instant invention impinges upon at least two of a number of photoelectric devices spaced around the shield so that as the rotor rotates, the light beam scans pairs of photoelectric devices in sequence. As the photoelectric devices are illuminated, the impedance level of a circuit controlled thereby is lowered so that it acts as a closed switch permitting current to pass through the stationary armature at appropriate junctures of the windings.

As the rotor rotates, a particular pair of photoelectric devices are illuminated causing the armature winding to be energized in a predetermined manner. The energized winding is positioned so that the magnetic fields generated thereby cooperate with the field of the permanent magnet rotor to cause rotation of the rotor in a predetermined direction.

Accordingly, a primary object of the instant invention is to provide a novel construction for a brushless D.C. machine.

Another object is to provide a novel brushless D.C. machine having the characteristics of a conventional commutating D.C. machine in which all parts of the armature winding are simultaneously energized by current paths provided by the windings in conjunction with an electronic switching means.

Still another object is to provide a novel brushless D.C. machine having the characteristics of a conventional commutaitng machine requiring all windings and magnetic materials to be simultaneously energized so that the size and weight of the machine is less for the same power output than would result if the materials were only sequentially and intermittently used.

A further object is to provide a novel D.C. machine in which commutation is achieved solely by electronic switching means without the necessity for utilizing relatively moving parts which physically engage one another.

These as well as other objects of this disclosure of invention shall become readily apparent after reading the following description of the accompanying drawings in which:

FIGURE 1 is a perspective of a brushless D.C. machine constructed in accordance with the teachings of the instant invention.

FIGURE 2 is an exploded perspective of the machine of FIGURE 1.

FIGURE 3 is a schematic representation of the rotor position detecting portion of the motor illustrated in FIGURES 1 and 2.

FIGURE 4 is a schematic illustrating the stationary armature winding and the connections to the D.C. energizing source through the electronic switching devices typically illustrated in FIGURE 5.

FIGURE 5 is an electrical schematic illustrating two of the six photoelectric switching units of FIGURE 4, one connecting a winding juncture to the negative terminal of the D.C. power supply, and the other connecting another winding juncture to the positive terminal of the D.C. power supply.

Figure 6:
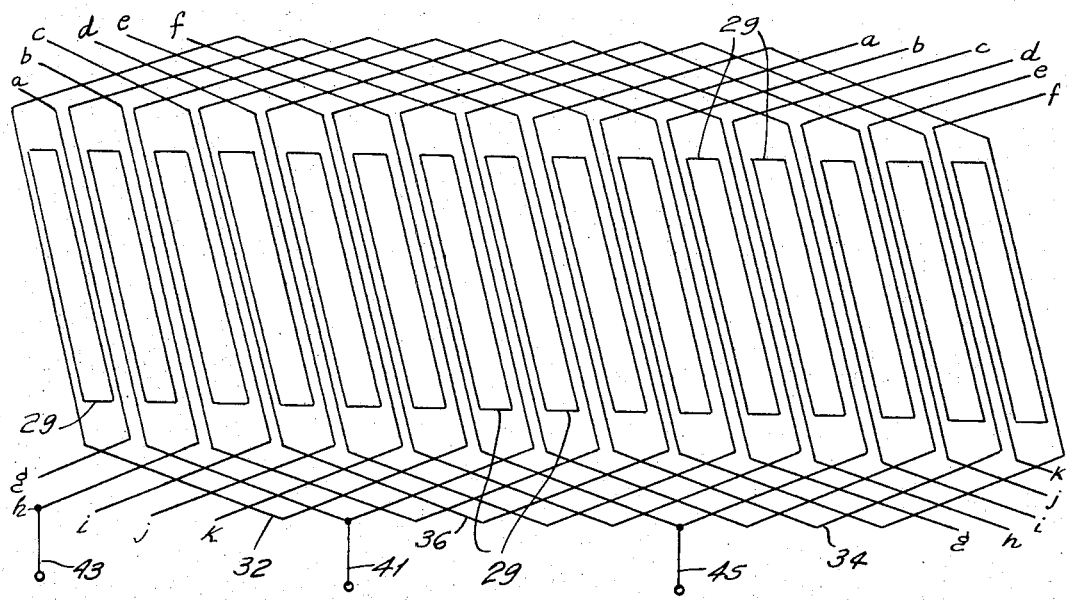
FIGURE 6 is an armature winding diagram of a winding suitable for armature assembly 12 in which there are three equally spaced taps on the winding as shown schematically in FIGURES 4 and 5.

Now referring to FIGURE 1 through 6, and more particularly to FIGURE 2. Brushless D.C. motor 10 comprises shell 11 which surrounds stationary armature assembly 12. The ends of shell 11 are covered by front and back end caps 13, 14, respectively, each provided with suitable bearings 15 which rotatably support motor shaft 16. Rotor 17 is a permanent magnet keyed to shaft 16 and disposed within armature assembly 12.

Stationary armature assembly 12 includes relatively low reluctance magnetic member 29 which is laminated and provided with teeth and slots wherein winding 30 is disposed and held by shell 11. Winding 30 consists of a conductor threading the slots of magnetic number 29 a plurality of times (see FIGURE 6) and finally joining the starting point in a closed loop. A plurality of equally spaced taps or juncture points 41, 43, 45 divide winding 30 into three sections or coil portions 32, 34, 36.

The plurality of slots and teeth in magnetic member 29 may be any number equal to or greater than the number of coil portions. However, it is preferred to make the number of slots and teeth whole number multiples of the coil portions, and it is preferred to construct member 29 with an odd number of slots and teeth to minimize cogging normally experienced with an even number of rotor poles. Magnetic member 29 may even be constructed such that the conductors occupy part of the air gap space with the magnetic member having a smooth surface instead of slots and teeth.

Commutation is achieved by means of solid state power switching unit 18 and solid state control and preamplifier unit 19 controlled by light source 20 and shield 21. Units 18 and 19 are mounted to the rear of end cap 14, being operatively positioned by means of appropriate spacers 27, 28. Preamplifier unit 19 includes a plurality of photoelectric devices P-1 through P-6 equally spaced from one another and circularly arranged about shield 21.

Light source 20 is mounted to power switching unit 18 on the forward side thereof and extends through central aperture 22 of preamplifier unit 19 into the interior of shield 21. Shield 21 is keyed to motor shaft 16 and is disposed rearwardly of end cap 14 extending through aperture 22. Shield 21 is provided with an aperture 23 so positioned and shaped that light emanating from source 20 and passing through aperture 23 will impinge upon at least two of the photoelectric devices P-1 through P-6 for any position of rotor 17.

Cover 24 is provided as an enclosure for the elements to the rear of end cap 14. An appropriate aperture (not shown) is provided through cover 24 to permit the passage of leads 25, 26 for connecting motor 10 to a source of direct current.

Photoelectric devices P-1 through P-6 are of a type well known to the art which possesses two states of conduction. That is, low conductance or high impedance when not illuminated and high conductance or low impedance when illuminated. Since the position of rotor 17 determines the position of shield 21 and aperture 23, the position of rotor 17 determines which photoelectric devices are illuminated. Aperture 23 is wide enough to always illuminate at least two photoelectric devices for any position of shield 21. A third photoelectric device will also be illuminated for a small angle of overlap which, as will hereinafter become apparent, insures that armature 12 will always be energized for starting at all positions of shaft 16. Members Q-1a, Q-2b, Q-3a, Q-4b, Q-5a and Q-6b are solid state switching elements of the transistor family which are operated as on-off saturated switches in a manner to be hereinafter explained.

Photoelectric device P-1 is connected to operate transistor Q-1a to the saturated "on" state when illuminated and allow Q-1a to remain in the "off" state when not illuminated. Likewise, P-2 operates Q-2b, P-3 operates Q-3a, P-4 operates Q-4b, P-5 operates Q-5a, and P-6 operates Q-6b. At the position shown in FIGURE 3 for shield 21 and aperture 23, photoelectric devices P-1 and P–2 are illuminated by source 20 through aperture 23 while shield 21 blocks passage of light to photoelectric devices P–3, P–4, P–5 and P–6. Thus, P–1 operates switching element Q–1a electrically connecting juncture 41 of winding 30 to line 25, which is the negative terminal of the D.C. power source, and P–2 operates switching element Q–2b electrically connecting juncture 45 of winding 30 to line 26, which is in the positive terminal of the D.C. power source. Under these circumstances, two parts of parallel current paths exist in winding 30 between junctures 41 and 45. One part consists of coil portions 32 and 34 in series and the other part consists of coil portion 36. Electron current flow in these paths produces a magnetic flux pattern in stationary armature 12 which is prearranged to be near space quadrature with the field of magnetized rotor 17 such that the rotor will seek magnetic alignment with the field of stationary armature 12 in a predetermined direction, for example, clockwise rotation. As the rotor 17 rotates clockwise, it carries shield 21 along until aperture 23 also allows passage of light to photoelectric device P–3. At this position, photoelectric devices P–1, P–2 and P–3 are illuminated operating switching elements Q–1a, Q–2b, and Q–3a to the on state. Under these new circumstances, Q–1a electrically connects juncture 41 to line 25, Q–2b electrically connects juncture 45 to line 26, and Q–3a electrically connects juncture 43 to line 25, and different parallel current paths exist from the D.C. power source through winding 30 from juncture 43 to juncture 45. One part of the new parallel current paths exists in coil portion 34 and the second part of parallel current path exists in coil portion 36. This new current path advances the stationary armature flux orientation 30 degrees clockwise from the first recited condition.

As the rotor continues to rotate clockwise, it carries shield 21 to the position where light is blocked to photoelectric device P–1, leaving only devices P–2 and P–3 illuminated. At this third position, P–2 operates Q–2b which electrically connects juncture 45 to line 26, and P–3 operates Q–3 which electrically connects juncture 43 to line 25. Under these new circumstances a third and different set of parallel current paths exist in winding 30. One path is from juncture 43 through coil portions 32 and 36 in series to juncture 45, and the other path is from juncture 43 through coil portion 34 to juncture 45. This new third set of current paths produces another 30 degree clockwise advance of the magnetic flux orientation in the stationary armature, maintaining the average flux orientation between stationary armature and magnetized rotor essentially in space quadrature and the rotor continues to rotate clockwise.

After going through like operations, the rotor finally carries shield 21 and aperture 23 through 180 degrees of rotation where aperture 23 allows passage of light to photoelectric devices P–4 and P–5. Under these circumstances, P–4 operates switching element Q–4b which electrically connects juncture 41 to line 26, and P–5 operates switching element Q–5a which electrically connects juncture 45 to line 25. Under these circumstances two parts of still different parallel current paths exist in winding 30. One part exists in coil portion 36 between junctures 45 and 41, and the second part exists in coil portions 34 and 32 in series between junctures 45 and 41. As is seen, this is the same parallel current path as existed when P–1 and P–2 were illuminated except the direction of current flow is reversed in the winding paths. Thus, the magnetic flux orientation will also be reversed in direction, equivalent to being rotated 180 degrees.

Like action continues as the rotor rotates through 360 degrees. Thus, it is seen that there are twelve discrete sets of parallel current paths provided by the three coil portions 32, 34, 36 and juncture points 41, 43, 45 in conjunction with the associated switching operations. There are six different parallel current paths provided when only pairs of photoelectric devices are illuminated and there are six other different parallel current paths when groups of three photoelectric devices are illuminated for a small angle of overlap. Maximum efficiency occurs when the zones of overlap are kept to a minimum.

This described action continues and the rotor rotates continually seeking magnetic alignment, but in rotating it carries shield 21 and aperture 23, operating the switching means which maintains the average armature flux orientation leading the rotor flux orientation essentially in space quadrature. It is preferred that a condition of exact quadrature occur between rotor and stator when shield 21 and aperture 23 is symmetrical about pairs of photoelectric devices.

It is usually preferred to keep the angle of overlap of three photoelectric devices to a minimum when the construction employs a small plurality of coil portions and juncture points to favor more efficient motor operation. In fact, one preferred embodiment employs interlocked switches, or the equivalent, so only two adjacent photoelectric devices can be active in operating switching elements even when three photoelectric devices are illuminated. This results in no overlap and the numerical plurality of parallel current paths are halved. But it is sometimes preferred to equalize the angle of overlap and the conduction angle when the construction employs a relatively large plurality of coil portions and juncture points in order to increase the current carrying capacity of the commutator.

As is apparent, there are two possible positions 180 degrees apart at which a quadrature can exist between the fields of the stationary armature and the magnetized rotor. Thus, a 180 degree change or reversal in either the armature flux orientation or the magnetized rotor flux orientation will cause the motor to operate in the reverse direction of rotation. As should now be obvious, photoelectric devices may be wired to the switching elements to provide for clockwise or counter-clockwise rotation. Switching the relatively low power level of the photoelectric devices by means of electronic switches, steering diodes or logic circuitry is one preferred method of construction which results in a machine that will run in either direction of rotation, or even reverse direction while running. Even the ends of the command lines for operating the electronic switch may be remotely located. For example, photoelectric device P–1, which is shown connected to operate switching element Q–1a, may be connected by way of an electronic switch to the normal switching element Q–1a by a clockwise command control signal, but connected to switching element Q–4b by a counter-clockwise command control signal.

This actually results in connecting a juncture point via switching means to one terminal or polarity of the D.C. power supply for a given rotor position and direction of rotation, but connecting the juncture point to the opposite terminal or polarity of the power supply at the same rotor position but for the opposite direction of rotation. Thus, when all elements are likewise treated, the machine is capable of rotation in either direction by a remote command signal.

A more simple approach is sometimes preferred in which the construction employs a second array of photoelectric devices. The electrical connections are duplicated but the physical location of the second array is angularly rotated 180 degrees from the first array. Means are provided to render either of the arrays active by a command control signal to obtain rotation in either direction.

Now consider the operation of a pair of switching elements typically represented by the schematic of FIGURE 5, the switching elements rendered energized when photoelectric devices P–1 and P–2 are illuminated at the position of shield 21 and aperture 23 as shown in FIGURES 3 and 5.

The illumination of P–1 completes a relatively low impedance path for electron current flow from lead 25 through the emitter to base junction of transistor Q–8, through wiring to emitter of Q–7, from the emitter to base of Q-7, through current limiting resistor R-1, through photoelectric device P-1 to lead 26. This emitter to base current of Q-7 is sufficient to create a low impedance path from emitter to collector of Q-7. Consequently, a second larger electron current flows in the now relatively low impedance path from lead 25 through the emitter to base junction of Q-8, from the emitter to collector of Q-7, through R-7 to lead 26. When this second electron current flows, a low impedance condition is created from the emitter to collector of Q-8 and a third and still larger electron current flows through the now relatively low impedance path from lead 25 to the emitter of Q-8, from the emitter to collector of Q-8, thence through the connection between the collector of Q-8 to the base of the Q-1a, from the base to emitter of Q-1a, thence to juncture 41 of winding 30, through winding 30 to juncture 45, thence through another energized switching circuit, functionally equivalent to Q-1a, being rendered active by photoelectric device P-2, which is represented by Q-2b of FIGURE 4a, the operation which will be described hereinafter, to line 26.

When this third electron current flows, a low impedance condition is created from the collector to emitter of Q-1a and a fourth and still large electron current flows inthe now relatively low impedance path from lead 25 to the collector of Q-1a, from the collector to emitter of Q-1a, to juncture 41 of winding 30, through winding 30 to juncture 45, thence through the other energized switching circuit, Q-2b hereinbefore mentioned, to line 26.

Specifically, the operation of the last recited switching circuit, Q-2b, hereinbefore mentioned, is described as follows:

Photoelectric device P-2, being illuminated, as before stated, completes the path for electron current flow from line 25 to the emitter of Q-10, from emitter to base of Q-10, through current limiting resistor R-8, through photoelectric device P-2 to line 26. This emitter to base current of Q-10 is sufficient to create a low impedance path from emitter to collector of Q-10. Consequently, a second larger electron current flows in the relatively low impedance path from lead 25 through emitter to collector of Q-10, through current limiting resistor R-10 to the base of Q-11, thence from base to emitter of Q-11, to lead 26.

When this third electron current flows, a low impedance condition is created from collector to emitter of Q-11 and a third and still larger electron current flows through the now relatively low impedance path from juncture 43 of winding 30 (picking up part of the current passed to winding 30 by switching element Q-1a rendered active by photoelectric device P-1, hereinbefore described) to the emitter of Q-2b, from emitter to base of Q-2b, through the connection between the base of Q-2b and the collector of Q-11, from collector to emitter of Q-11 to lead 26.

When this third electron current flows, a low impedance condition is created from the emitter to collector of Q-2b and a fourth and still larger electron current flows in the now relatively low impedance path from juncture 43 of winding 30 (again picking up current passed to winding 30 by the switching element rendered active by photoelectric device P-1, hereinbefore described) to the emitter of Q-2b, from the emitter to collector of Q-2b, to line 26.

These electron current paths of each switching element drop in impedance in a rapid almost instantaneous sequence with a switching time in the order of microseconds which is an insignificant porton of the illumination time for the photoelectrc devices.

Resistors R-1 and R-2 are connected between photoelectric device P-1 and lead 25 with the juncture between these resistors being connected to the base of Q-7. Resistor R-5 is connected between the base and emitter of Q-8. Resistor R-7 is connected between collector of Q-7 and lead 26. Resistor R-6 is connected between the emitter and base of Q-1a.

Resistors R-8 and R-9 are connected between photoelectric device P-2 and lead 25 with the juncture between these resistors being connected to the base of Q-10. Resistor R-11 is connected between the emitter and base of transistor Q-11. Resistor R-12 is connected between the emitter and base of transistor Q-2b. Resistor R-10 is connected between the collector of Q-10 and the base of Q-11. Resistors R-2, R-5, R-6, R-9, R-11, and R-12 stabilize the associated transistors by shunting some of the transistor leakage current around the base-emitter junction.

Photoelectric device P-1, followed by amplifying transistors Q-7, Q-8, and Q-1a along with the associated resistors R-1, R-2, R-5, R-6 and R-7 comprise the switching element shown by block Q-1a in FIGURE 4a. Photoelectric device P-2, followed by amplifying transistors Q-10, Q-11, and Q-2b, along with associated resistors R-8, R-9, R-10, R-11, and R-12 comprise the switching element shown by block Q-2b in FIGURE 4.

Figure 7:
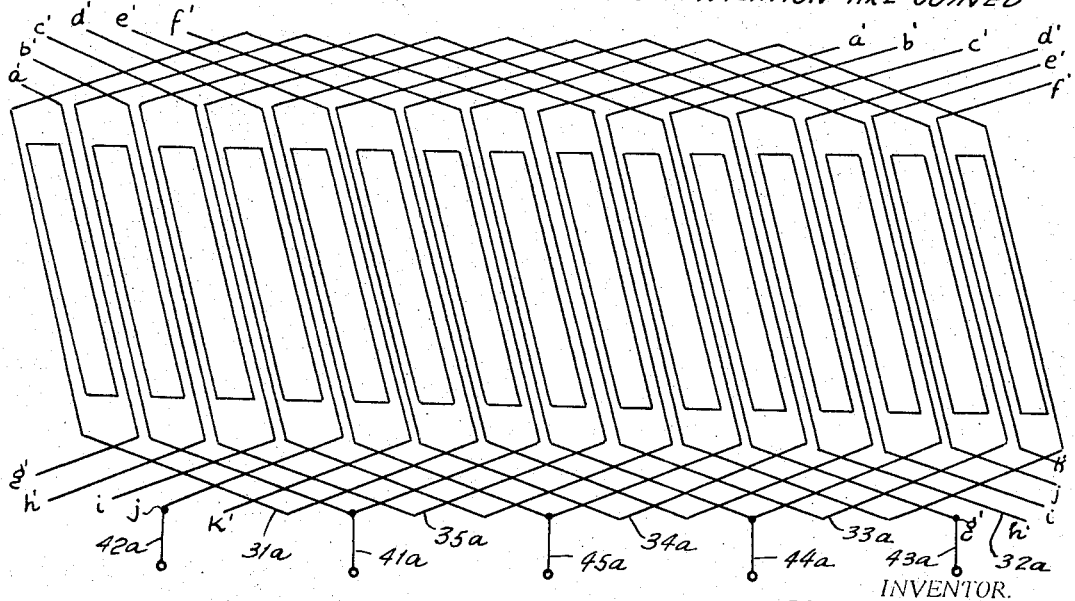
FIGURE 7 is a diagram of the FIGURE 6 repeated, except that five equally spaced taps are provided for a like construction employing a larger plurality of switching elements.

Now referring to FIGURES 6 and 7 which are armature winding diagrams, each with a different plurality of taps. The windings and frame are identical, only the number of equally spaced taps are different. FIGURE 6 requires six commutator switching elements, as in FIGURE 4. The embodiment of FIGURE 7 requires ten switching elements to control commutation between five coil sections 31a, 32a, 33a, 34a, 35a jointed in a closed loop at junctures 41a, 42a, 43a, 44a, 45a. Motors using either number of taps and switches operate identically except that the angular commutating zones each are different. The angular commutating zone becomes less as the number of taps and switches are increased.

In the electric motor designs there is a well known maximum theoretical efficiency which any form of winding may approach as a limit. The limiting value of efficiency approaches 100 percent, disregarding rotational losses, as the angular commutation zone approaches zero degrees (or zero variation in the counter electromotive force of the winding). Hence, the relatively larger plurality of taps and associated switches, achieves higher operating efficiency. It is partly because of this fact that the closed loop winding is predominately superior to other winding forms.

Thus, it is seen that the instant invention provides a novel construction for a direct current machine having the characteristics of a typical D.C. machine which employed brush type commutating means. The construction is such that all relatively moving elements are physically spaced from each other so that switching signals are coupled through an air space, or liquid gap. Further, the construction is such that rotor position is detectible even with the rotor at standstill.

While the embodiment of 1 through 5 has been illustrated as comprising a visible light source in conjunction with an apertured light shield, it is to be understood that this arrangement may be readily replaced by a construction in which any source of emission, including a radio active element is imbedded in a portion of the rotor shaft. This portion of the shaft must then be constructed of a material offering high attenuation to the radiation from the imbedded element except that radiation may take place freely through an aperture in the shaft, or attenuation may take place by a differential in distance to various radiation detectors by positioning the radio active element on the periphery of the shaft. In this embodiment, a number of radiation detectors are circularly arranged so that they are scanned by a radiation beam as the rotor rotates with these radiation detectors functioning in the manner of the photosensitive devices of FIGURES 1 through 5.

In connection with FIGURES 1 through 5, it is to be understood that photoelectric devices P-1 through P-6 may be used as switches directly feeding the motor windings within the power handling capabilities of the photoelectric devices. However, for most practical applications, the photoelectric devices will be utilized to control amplifier stages which act as ON-OFF switches to operate at a power greater than the capacity of the photoelectric devices.

It is also to be understood that construction of the type having previously been described may readily be adapted to provide bidirectional drive by providing electronic switching from the photosensitive device to the amplifiers, instead of employing a second set of photoelectric devices, with individual input lines provided to command the motor to run in the required direction of rotation, or even include a rectifying element in the motor input line, with individual input lines routed through a diode, one to each input line, to provide for bidirectional rotation by reversing the motor input polarity.

It is also to be understood that, although the device having been described as a two pole machine, the machine may be constructed with any plurality of pairs of poles. The number of switching elements are the same for the multipolar machine as for the two pole machine if all cooperating winding sections are series or parallel connected. Otherwise, the construction of the multipolar winding will be according to the old art of the brush type machine. However, the shield-aperture will have a shield and aperture section for each pole pair and it is not necessary for the photoelectric devices to be equally spaced physically on a 360° circle as is for the two pole machine, but only equally spaced in any one of the plurality of electrical 360 degree zones, or a mixture of positions from the zones thereof.

It is also to be understood that, although the device disclosed herein includes a closed loop winding having three taps and six switching elements, the smallest number possible and easiest of description, the device may be constructed with a closed loop winding having any number of winding taps, and a pair of switching elements associated with each tap for connecting each tap to either terminal of the energizing source.

It should now be further understood, that when the closed loop armature winding is constructed with three winding sections and junctures, the number of conductors and the wire diameter may be changed, and the internal connection of winding sections re-arranged, according to the well known and practiced delta to wye conversion, with comparable results, except for harmonic currents and voltage differences, and the well known 30 degree space phase shift.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A device of the class described comprising a D.C. supply, a torque producing unit, a static switching means; said unit including a rotor and a stator; said switching means operatively connected to said stator for controlling energization thereof– said stator having a main winding means including a plurality of coil portions joined to said switching means at a plurality of juncture points in a closed loop circuit; said D.C. supply having a positive and a negative terminal; said switching means including a first and a second group of sections; each of said juncture points connected to said positive terminal by an individual section of said first group; each of said juncture points connected to said negative terminal by an individual section of said second group; said control means including a radiation producing source and directing means for controlling radiation emanating from said source; each of said sections including an element sensitive to said radiation emanating from said source; said directing means including a portion mounted for rotation by said rotor and constructed to control impingement of said radiation from said source upon selected ones of said elements as a function of rotor position; each of said sections presenting a relatively low impedance to current flow from said D.C. supply through said stator upon impingement of said radiation on its respective element and essentially blocking said current flow under other conditions; said portion being physically spaced from said switching means and operatively positioned to control operation thereof whereby for any given position of said rotor predetermined ones of said juncture points are provided with low impedance connections to said terminals and all of said coil sections are energized with directions of respective currents in said coil sections being a function of rotor position; said portion constructed to subject at least two of said elements to said radiation from said radiation producing source for all positions of said rotor; said elements positioned so that for any given position of said rotor said switching means provides a complete low impedance connection for D.C. current flow from said D.C. supply through said main winding means; said plurality of juncture points being an odd number no less than three; said elements positioned so that for any given position of said rotor a section from each of said groups presents a low impedance connection between said main winding means and said D.C. supply; for a first zone of angular positions of said rotor said plurality of coil portions providing first and second parallel parts of low impedance current paths between said terminals of said D.C. supply; said first part having an impedance greater than the impedance of said second part.

2. A device as set forth in claim 1 in which said elements are equally spaced in a circular array with said elements of said sections in said first group interposed between said elements of said sections in said second group.

3. A device as set forth in claim 1 in which said rotor is permanently magnetized and said coil portions are energized in a manner to generate a predetermined pattern of armature magnetic flux essentially in magnetic space quadrature with rotor magnetic flux; current flow through said coil portions being in a first direction for a first zone of angular positions for said rotor and in said second direction opposite to said first direction for a second zone of angular positions for said rotor 180 electrical degrees from said first zone.

4. A device as set forth in claim 3 in which for any given rotor position a first and a second of said juncture points which are connected to different ones of said terminals by low impedance connections are electrically spaced around said closed loop circuit by 180 degrees minus the ratio of 180 degrees divided by the total number of juncture points.

5. A device as set forth in claim 4 in which the juncture points are connected to said terminals by low impedance connections in an overlapping staggered sequence such that a half portion of a zone of angular rotor positions at which one of said juncture points is connected to said first terminal by a low impedance connection overlaps a half portion of a zone of angular rotor positions at which another of said juncture points is connected to said second terminal by a low impedance connection, and during remaining portions of said zones of angular rotor positions during which either of said one and said another of said juncture points are connected to said supply with a low impedance connection since other of said juncture points will be connected to said supply with a low impedance connection to provide different current paths through said armature.

6. A device as set forth in claim 1 in which said first parallel part includes a predetermined number of said coil portions connected in series; said predetermined number being one greater than the number of said coil portions in said second parallel part.

7. A device of the class described comprising a D.C. supply, a torque producing unit, a static switching means;

said unit including a rotor and a stator; said switching means operatively connected to said stator for controlling energization thereof; said stator having a main winding means connected to said switching means at a plurality of juncture points; said D.C. supply having a positive and a negative terminal; said switching means including a first and a second group of sections; each of said juncture points connected to said positive terminal by an individual section of said first group; each of said juncture points connected to said negative terminal by an individual section of said second group; said control means including a radiation producing source and directing means for controlling radiation emanating from said source; each of said sections including an element sensitive to said radiation emanating from said source; said directing means including a portion mounted for rotation by said rotor and constructed to control impingement of said radiation from said source upon selected ones of said elements as a function of rotor position; each of said sections presenting a relatively low impedance to current flow from said D.C. supply through said stator upon impingement of said radiation on its respective element and essentially blocking said current flow under other conditions; said portion being physically spaced from said switching means and operatively positioned to control operation thereof whereby for any given position of said rotor predetermined ones of said juncture points are provided with low impedance connections to said terminals; said portion constructed to subject at least two of said elements to said radiation from said radiation producing source for all positions of said rotor; said elements positioned so that for any given position of said rotor said switching means provides a complete low impedance connection for D.C. current flow from said D.C. supply through said main winding means; said plurality of juncture points being an odd number no less than three; said elements positioned so that for any given position of said rotor at least one section from each of said groups presents a low impedance to current flow through said stator; said main winding means including a plurality of coil portions connected together in circuit so that for essentially all positions of said rotor there is current flow in more than half of said coil portions connected in series with direction of said current flow being a function of rotor position.

8. A device as set forth in claim 7 in which for essentially all positions of said rotor there is a complete current path between said terminals including at least two of said coil portions connected in series.

9. A device as set forth in claim 8 in which said rotor is permanently magnetized and said coil portions are energized in a manner to generate a predetermined pattern of armature magnetic flux essentially in magnetic space quadrature with rotor magnetic flux; current flow through said coil portions being in a first direction for a first zone of angular positions for said rotor and in a second direction opposite to said first direction for a second zone of angular positions for said rotor 180 electrical degrees from said first zone.

10. A device as set forth in claim 9 in which for any given rotor position a first and a second of said juncture points which are connected to different ones of said terminals by low impedance connections are electrically spaced around said closed loop circuit by 180 degrees minus the ratio of 180 degrees divided by the total number of juncture points; said juncture points connected to said terminals by low impedance connections in an overlapping staggered sequence such that a half portion of a zone of angular rotor positions at which one of said juncture points is connected to said first terminal by a low impedance connection overlaps a half portion of a zone of angular rotor positions at which another of said juncture points is connected to said second terminal by a low impedance connection, and during remaining portions of said zones of angular rotor positions during which either of said one and said another of said juncture points are connected to said supply with a low impedance connection since other of said juncture points will be connected to said supply with a low impedance connection to provide different current paths through said armature.

11. A device as set forth in claim 7 in which said plurality of juncture points are three in number.

References Cited

UNITED STATES PATENTS

| | | | |
|---|---|---|---|
| 3,023,348 | 2/1962 | Cox | 318—138 |
| 3,131,341 | 4/1964 | Kniazeff | 318—138 |

ORIS L. RADER, *Primary Examiner.*

G. A. FRIEDBERG, G. RUBINSON,
*Assistant Examiners.*